United States Patent
Cleckner et al.

(10) Patent No.: US 8,479,478 B2
(45) Date of Patent: Jul. 9, 2013

(54) SURFACE-TREATED MULTI-LAYERED POLYMER FILM

(75) Inventors: Michael Dale Cleckner, Rochester, NY (US); Scott P. Wilkins, Pittsford, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 915 days.

(21) Appl. No.: 12/122,322

(22) Filed: May 16, 2008

(65) Prior Publication Data

US 2008/0209865 A1  Sep. 4, 2008

(51) Int. Cl.
*B65B 11/00* (2006.01)

(52) U.S. Cl.
USPC .................. 53/461; 53/477; 53/463; 428/347

(58) Field of Classification Search
USPC .................. 53/461, 451, 452, 453, 463, 477, 53/551; 428/347, 349, 354, 317.7, 394
See application file for complete search history.

(56) References Cited

U.S. PATENT DOCUMENTS

| | | | |
|---|---|---|---|
| 4,185,148 A | 1/1980 | Sato et al. | |
| 4,386,129 A | 5/1983 | Jacoby | |
| 4,780,364 A | 10/1988 | Wade et al. | |
| 4,975,469 A | 12/1990 | Jacoby et al. | |
| 5,134,174 A | 7/1992 | Xu et al. | |
| 5,176,953 A | 1/1993 | Jacoby et al. | |
| 5,236,963 A | 8/1993 | Jacoby et al. | |
| 5,252,389 A | 10/1993 | Schmidt et al. | |
| 5,310,584 A | 5/1994 | Jacoby et al. | |
| 5,317,035 A | 5/1994 | Jacoby et al. | |
| 5,407,611 A | 4/1995 | Wilhoit et al. | |
| 5,466,498 A | 11/1995 | Forloni et al. | |
| 5,491,188 A | 2/1996 | Ikeda et al. | |
| 5,529,843 A | 6/1996 | Dries et al. | |
| 5,594,070 A | 1/1997 | Jacoby et al. | |
| 5,833,904 A | 11/1998 | Muskalla et al. | |
| 6,235,823 B1 | 5/2001 | Ikeda et al. | |
| 6,634,158 B1 * | 10/2003 | Bois | 53/551 |
| 6,729,112 B2 * | 5/2004 | Kuss et al. | 53/551 |
| 6,845,602 B2 * | 1/2005 | Drut | 53/551 |
| 6,868,650 B2 * | 3/2005 | Sanchez | 53/202 |
| 2002/0029844 A1 | 3/2002 | Davidson et al. | |
| 2003/0129373 A1 | 7/2003 | Migliorini et al. | |
| 2004/0081842 A1 | 4/2004 | Peet | |
| 2006/0029824 A1 | 2/2006 | Gringoire et al. | |

FOREIGN PATENT DOCUMENTS

| | | |
|---|---|---|
| EP | 0865909 | 9/1998 |
| EP | 0865911 | 9/1998 |
| EP | 0865912 | 9/1998 |
| EP | 0865913 | 9/1998 |
| EP | 0865914 | 9/1998 |
| GB | 2 009 033 | 6/1979 |
| WO | WO 98/37140 | 8/1998 |
| WO | WO 2004/094141 | 11/2004 |
| WO | WO 2010/036724 | 4/2010 |
| WO | WO 2010/114535 | 10/2010 |

OTHER PUBLICATIONS

Meiron et al., "*Wetting Properties of Food Packaging*", Food Research International, 2007, vol. 40, pp. 653-659.

* cited by examiner

*Primary Examiner* — Sameh H. Tawfik

(57) ABSTRACT

A sealable polymeric film structure comprising (a) a core layer including a thermoplastic polymer, the core layer having a machine side and a product side that is on a side of the film opposite from the machine side; and (b) a sealable skin layer positioned on the product side of the core layer, the sealable skin layer including a thermoplastic polymer, wherein an exterior surface of the sealable skin layer has a receding Cahn value of at least about 0.48; and wherein in some heat—sealable embodiments, the sealable skin layer sealed to itself has a MST of from about 175° F. to about 220° F., with a jaw pressure of 20 psi for 0.75 seconds and a minimum acceptable seal strength of 200 g/in at 175° F., on a Wrap-Ade™ Crimp Sealer Model J or K.

12 Claims, No Drawings

SURFACE-TREATED MULTI-LAYERED POLYMER FILM

CROSS-REFERENCE OF RELATED APPLICATIONS

This application claims benefit of priority to Provisional U.S. Application No. 60/613,157 filed Sep. 24, 2004 and U.S. application Ser. No. 11/232,192 filed Sep. 21, 2005 and is incorporated herein by reference.

FIELD OF THE INVENTION

This invention relates to polymer films, such as are useful for packaging films. More particularly it relates to heat sealable, biaxially-oriented film structures that are surface treated on the sealing surface. In preferred embodiments, the film is a multilayer film.

BACKGROUND OF THE INVENTION

Multilayer polymeric films are commonly used for packaging products such as snack foods, including candies, potato chips, cookies, ice cream bars and dairy products. The versatility and compositional variation of polymer films facilitate usefulness in a variety of packaging applications. A wide array of film compositions are available today due to custom tailoring a multitude of variables related to polymer composition, additives, and method of preparation of the film to suit a particular product application and service environment. Seemingly small changes in composition or properties often determine whether or not a film will perform suitably. For example, although polymer films have many desirable properties, untreated or uncoated films may possess certain inherent disadvantages, such as relatively poor water wetability, poor printability, poor barrier properties and/or blocking with adjacent film layers.

Frequently, a primary concern in designing multiple-layer films for packaging is to ensure that the film can be processed, prepared and utilized on high speed converting and form-fill-and-seal ("FFS") machinery. Vertical FFS packaging apparatus operate by unwinding continuous film from bulk rolls, pulling the film over a forming collar, followed by forming pouches or bags by sealing lower and side portions of the package, filling the package, and finally sealing the upper portion to close the package. Horizontal FFS packaging apparatus operate by unwinding continuous film from bulk, aligning the film along a horizontal track, positioning the product or container, such as an item or box, on the film in a determined position and orientation, followed by forming and bending the film around the product or container, either snuggly or loosely, to form a package, and thereafter sealing the package closed.

Therefore, in many packaging operations, the film must have sufficient flexibility and machinability to undergo mechanical folding from a roll-fed or flat orientation to a folded condition and be subjected to a sealing function which is part of high-speed packaging apparatus. The higher the packaging speed, the more difficult this operation becomes. In addition to aesthetic and optical qualities, the ability of the film to perform reliably on high speed equipment, including unrolling, processing, folding and sealing equipment, are typically primary objectives in film composition design. Line speed is dictated by a number of factors, including friction with machinery, blocking tendencies, sealability, and packaged product interaction with the film. For many such packaging operations, the product-film interaction factor is not a big consideration. However, for some applications, such as foods, powders, grease-bearing products, and moist or wet products, this factor may become of quite significant importance with respect to the interaction over an extended period of time. An additional consideration for the product-film interaction factor is the interaction precisely during packaging operations, as this factor may significantly control the ability to increase packaging operation speed.

The performance of a film embodiment, during packaging operations, may vary with changes in environmental conditions and can adversely impact properties on one or both sides of a film. For example, in a dairy environment where frozen ice cream novelties and frozen water-based pops may be packaged, temperature and humidity conditions may vary widely and inconsistently at various regions within the facility, and within the vicinity of packaging operations, where the packaging equipment and processes are located. For example, the packaging film may be utilized in relatively dry conditions for a period of time and then under more humid and even wet conditions at another time, when the packaging equipment and/or adjacent packaging equipment is washed with water, which may occur several times per day. Also, the composition of the products on a line may vary widely, such as from sugar-based to sugar-free variety of a product.

In a humid or wet environment, undesirable friction characteristics may adversely affect the performance of either or both sides of the film. Friction between packaging equipment surfaces and the film, and/or between the product and the film may cause packaging imperfections and impede high-speed processing. For example, frozen pops or ice cream bars that are made from a syrup, cream or sugar-based solution may readily adhere and "tack-up" as the product engages the product side of the film, remaining in the proper position and orientation for the packaging process, while a sugar-free version of the product may slide or reorient on the film during packaging operations, resulting in either operational problems and slowing down the packaging line to accommodate the product variations. A misaligned product may create increased product waste, film waste, machine damage and down-time, due to the product getting caught or chopped in the seals during the packaging process.

On the opposite side of the film, the machine side, the film must be able to slide over a variety of stationary, rotating, metal, nonmetal, heated, and/or refrigerated surfaces, while maintaining a stable coefficient of friction and good slip characteristics relative to all of the surfaces. As relative humidity increases and condensation forms on equipment, the moisture may adhere to the film creating an excessive staccato movement of the film as the film repeatedly sticks and then releases from the wet machine surfaces. This staccato movement frequently results in inconsistent package length, film jams, tears, and exaggerated product misalignment problems on the opposing, product side of the film.

There exists in the art, the need for a sealable film with improved processability, machinability, and reliability over a range of temperature, relative humidity and dampness conditions, ranging from relatively dry to a substantially wet environment, without adversely impacting other desirable film parameters, such as film sealability, moisture barrier properties, interaction with the packaged product, and optical and appearance properties.

SUMMARY OF THE INVENTION

This invention provides a film that has functionally useful friction-related properties on both sides of the film to facilitate improved machinability and processability in a relatively high humidity or moist environment, to facilitate improved packaging speed. One side of the film may offer improved processing and packaging machinery interaction while the opposing product side of the film provides advantages for interaction between the film and certain products, such as aqueous-based products. The film exhibits acceptable sealability, desired appearance and optical properties, is substantially non-blocking, and may be useful with moisture-comprising products and in relatively humid conditions, such as with freshly baked confectioneries, dairy products, and water-based products. The film may be suitable for use in packaging relatively low-moisture-content products, such as dry foods, and for use in dry environments. The film may be particularly well suited for use with horizontal form, fill and seal applications (HFFS), vertical, form, fill, and seal applications (VFFS), overwrap applications, pouches, bags, and for use in multilane HFFS packaging applications. The multilayer film can be used as a coextruded web, or as a component of a laminated film structure. More specifically, the invention provides a film structure that includes a polymer core layer and a heat-sealable polymer skin layer, with the exterior surface of the skin layer possessing sufficient surface-energy to facilitate advantageous film interaction with various products.

A key aspect of this invention is that the exterior surface of the sealable skin layer, (typically the product side surface, that is, the surface of the sealable skin layer opposite the core layer side of the sealable skin layer) possesses relatively high energy or is treated to increase the surface energy thereof. If treated to increase the energy, the film is preferably only treated to a limited extent to prevent degradation of the sealability of the sealable skin layer and to prevent treating the opposing side of the film. The relatively high energy or surface treatment may render the product side exterior surface of the film substantially hydrophilic in nature. Additionally, the exterior surface of the film on the side of the core layer opposite the sealable layer, the machine side surface of the film, is either not treated to increase surface energy, or is treated but the surface energy properties are attenuated, such as by printing or coating, such that the surface is substantially low-energy or hydrophobic in nature, as compared to the product side exterior surface. Films according to the present invention comprise the combination of both; (i) the treated or relatively higher-energy, substantially hydrophilic product side surface properties, and (ii) the untreated or relatively low-energy, substantially hydrophobic, machine side surface properties. However, there may be applications for some embodiments where the machine side surface may be lightly treated, such as for printability, and then at least partially obscured to prevent the machine side from being too hydrophilic.

DETAILED DESCRIPTION OF THE INVENTION

For clarity purposes, the films described herein may be referred to as having a product side and a machine side, the machine side being opposite the product side. The product side of the film may be defined as the side or surface of the film or layers of the film that may be considered on the inside of a package created using the film, which is the side that typically faces toward or comes in contact with a product that may be packaged using the film. The machine side of the film may be defined as the outside or side or surface of the film or layers of the film, that face opposite from the product side and may typically engage the film feeding and handling components of the packaging machinery and support package printing and graphics.

Preferred embodiments are multilayer, coextruded polymer film structures, typically comprising a core layer and two skin layers, though one or more tie layers may be present between the core layer and a skin layer. The term "core layer" as used herein refers to the only layer of a monolayered film or the thickest layer of a multilayered film. The core layer of a multilayer structure typically will be the innermost or more centrally positioned layer of the film structure with respect to the other, more external layer(s) on one or each side of the core layer. It is understood that when a layer is referred to as being "directly on" another layer, no intervening layer(s) is/are present. On the other hand, when a layer is referred to as being "on" another layer, intervening layers may or may not be present. The core layer includes a product side and a machine side.

It is commonly understood in the art that polymer films have two major, outer-most surfaces, each being an exterior surface and each on an opposite side of the film from the other. The term "exterior" as used herein refers to such major surfaces, with one such surface on a "product side" of the film and an opposing exterior surface of the film positioned on a "machine side" of the film.

The polymer film includes a core layer and the core layer may be clear or made opaque such as by cavitation. The core layer comprises a polymeric matrix, preferably containing olefin polymers and more preferably containing a propylene polymer. Suitable preferred core layer polyolefin materials include polypropylene, polyethylene, polybutene, and copolymers and blends thereof. The term "propylene polymer" as used herein includes homopolymers as well as copolymers of propylene, wherein a copolymer not only includes polymers of propylene and another monomer, but also terpolymers, etc. However, in many preferred embodiments the propylene polymer is a propylene homopolymer. An isotactic polypropylene containing at least 80% by weight of isotactic polypropylene may be particularly preferred in many embodiments. The propylene polymer of the core layer preferably has an isotacticity ranging from about 80% to 100%, preferably greater than 85%, most preferably about 95% to 96%, as measured by $^{13}C$ NMR spectroscopy using meso pentads. A mixture of isotactic propylene polymers may be used. When a mixture is used, preferably the mixture comprises at least two propylene polymers having different m-pentads. Preferably, the difference between m-pentads is at least 1%. Furthermore, the propylene polymer of the core layer preferably has a melt flow index ranging from about 2 to about 10 g/10 minutes, most preferably from about 3 to about 6 g/10 minutes, as measured according to ASTM D1238 at 190° C. under a load of 5 lbs. In some embodiments, the core layer may also comprise a blend or copolymer containing propylene and another $C_4$-$C_{10}$ olefin.

Commercially available and exemplary propylene polymers that are suitable for the core layer of many embodiments may include PP 3371, an isotactic propylene homopolymer sold by Atofina Petrochemicals (Houston, Tex.), and PP 4712, an isotactic propylene homopolymer from ExxonMobil Chemical Company (Houston, Tex.).

Though many preferred film embodiments are relatively clear or transparent, in some embodiments the core layer may be voided or cavitated to create an opaque film. Cavitation may be effected such as by conventional cavitating methods using void-inducing particles that are incompatible with the polymer. Suitable conventional void-inducing particles may include organic particles such as polybutylene terephthalate ("PBT") or nylon, or inorganic particles such as calcium carbonate. Cavitation may also be introduced by beta-cavitation, which includes creating beta-form crystals of polypropylene and converting at least some of the beta-crystals to alpha-form polypropylene crystals, thereby creating a small void remaining at the situs after the conversion. Preferred beta-cavitated embodiments of the core layer may also comprise a beta-crystalline nucleating agent to induce creation of the beta-form polypropylene crystals. Substantially any beta-crystal nucleating agent ("beta nucleating agent" or "beta nucleator") may be used. The core layer may also include pigments, dies, or other hazing and/or coloring agents.

The film includes a sealable skin layer that is preferably coextruded with the core layer and is positioned on the product side of the core layer. The sealable layer may be defined to include a first side on the side of the sealable layer that is on the product side of the core layer, and a second side opposite the first side, the second side providing an exterior surface for the film on the product side of the core layer. The sealable skin layer preferably comprises a polymer material that is heat sealable and provides the seal properties necessary for the desired application. Exemplary polymer materials for the sealant layer include homo-, co-, and terpolymers containing olefin polymers, such as polypropylene, polyethylene, polybutene, and preferably those that are heat sealable. Other sealant layer materials may include a polylactic acid and preferably propylene-ethylene copolymers or propylene-butylene copolymers or ethylene-propylene-butylene terpolymers.

In still other embodiments, one or more product side polymeric tie-layers may be positioned between the product side of the core layer and the sealable skin layer. Suitable product side tie layer polymers may include one or more of the polymers such as may be suitable for the core and/or sealable skin layer.

In some film embodiments, the sealable skin layer may also contain a processing additive, such as an anti-block agent, e.g., TOSPEARL™ particulates, a Mitsubishi Polymers product. For example, a particulate slip/antiblock system may comprise non-migratory crosslinked hydrocarbyl-substituted polysiloxane particles, and/or silica particles.

A novel and beneficial feature of a film according to this invention is that the product side exterior surface of the sealable skin layer either inherently possess a relatively high surface energy or is treated to increase the surface energy or wetting tension of that surface, as compared to the untreated wetting tension of such surface. However, if treatment is required to attain the desired surface energy, the amount of treatment should be carefully limited or controlled such that the surface is not over treated to the point that the treatment destroys or unacceptably reduces the sealability of the sealable skin layer. A controlled treatment level is also desirable so that other performance characteristics, such as optical and barrier characteristics are not impaired and so that the opposing exterior surface of the film is not inadvertently treated. If the inherent surface energy of the sealant layer polymer is insufficient to provide the desired wetability, the exterior surface of the film on the product side of the core layer may be treated by any of the known treatment techniques, depending upon the desired film use and desired degree of treatment, such as by corona, flame, or plasma treatment, with corona treatment preferred for many applications.

A key benefit realized from increased wetting tension and surface energy on the product side exterior surface of the sealable film is improved adhesivity or tackup with respect to interaction between the film surface and a product being packaged. The increased or relatively high surface energy may improve the packaging-line performance of the film for certain products, such as moisture-bearing products, over a wide variety of moisture-related conditions, as compared to the interaction between such product and an untreated film surface. The more energized product side exterior surface may afford improved performance of the film in packaging aqueous-based products and/or provide improved packaging use in a humid or wet environment. The relatively high surface energy may increase the molecular attraction between the film surface and the product. This increased energy may translate into an increased surface wetting tension, rendering the film surface more hydrophilic and attractive to products containing polar components, such as frozen novelty or ice-pop treats. The benefit may be most apparent if the packaged product is one that has polar tendencies, such as water. The inventor has learned that during high-speed packaging of aqueous-based or moist products, the products more readily adhere or tack-up better on the relatively high-energy film surface than on an untreated or otherwise lower-surface-energy surface. The improved molecular attraction may help the product adhere to and tack-up on the film surface, without easily sliding about, reorienting, or becoming misaligned, as can happen with products on film surfaces that tend to be more charge-neutral or somewhat hydrophobic. The molecular attraction from the energized surface may also provide packaging line operational benefit when the product is frozen and does not substantially wet out on the film, such as with frozen ice-pop treats. It has also been learned that the treated surface also may not adversely impact the performance of the film with respect to packaging relatively dry and/or non-polar products or when used in a relatively less humid environment. Thereby, the film may be useful in a variety of packaging operations and over a wide humidity range.

The benefit of improved film-product interaction results from the film having a relatively energized product side skin layer, exterior surface. Film surface energy is a solid surface characteristic associated with the molecular forces of the interaction of that surface with another material. Surface energy is the true film characteristic that is desirable to measure, but it may not easily be measured directly. Therefore, this property may be characterized by measuring one of two substitute properties, namely "wetting tension" or "contact angle." Both of these measurements involve observing the behavior of liquids placed on the films' surface. Surface tension is the force that exists between a liquid and the atmosphere it is in. For example, in atmospheric air, a drop of water will tend to "bead up" on some solid surfaces, such as a newly waxed vehicle hood. It is primarily the surface tension existing between the water and the air that produces this effect. The drop of water can spread, or wet-out, on a solid surface if the solid surface has molecular forces (surface energy) high enough to overcome the water/air surface tension and draw the water relatively flat onto the solid surface, such as a treated film surface. Wetting tension is the maximum liquid surface tension that will spread, rather than bead up, on the film surface. It is a measurable property that estimates a film's surface energy. ASTM D 2578 provides a test procedure for determining wetting tension by applying different test solutions of increasing surface tensions until one is found that just spreads (wets) the film surface. Units are dynes/cm. However, although the wetting tension test may be relatively quick and simple to perform, the results tend to vary widely such that repeatability may be difficult to obtain.

Measurement of contact angle may be a more preferred method of characterizing the surface energy of a film. One method of measuring contact angle is by using a Cahn Model DCA-300, DCA-312, or DCA-315 contact angle measurement instrument to measure the dynamic contact angle (DCA). Unlike the ASTM contact angle test that applies a single water droplet, the Cahn test immerses a prepared film sample into a beaker of distilled water at a constant rate of speed, while sensitive balance records the "advancing" wetting force. The instrument then reverses and pulls the sample from the water, recording the "receding" wetting force. The Cahn DCA software contains well established calculations to convert the measurements into advancing and receding contact angle values. The measurement value that is reported is the "Cahn value," which is calculated as the cosine of the receding angle that forms between the measuring fluid and the subject surface as the film is pulled from the liquid.

The receding contact angle is frequently recognized and accepted as the best indicator of surface energy adhesion properties. The receding angle is the angle at which a drop of liquid forms when being pulled away from the film surface, and is the angle that is of most interest. The higher the receding DCA Cahn value, the lower the angle, the higher the surface energy, and the better the water-film adhesion. A low receding angle is consistent with a relatively water-wet surface, demonstrating a corresponding, relatively high surface energy. Relatively higher surface-energy surfaces reflect an increased Cahn value, which may approach 1.00. The angle and cosine value is calculated by the Cahn DCA measuring equipment and a receding angle of about 30 degrees may exhibit a Cahn value of about 0.87, a receding angle of about 45 degrees may have a Cahn value of about 0.71, an angle of about 60 degrees may have a Cahn value of about 0.50, and a relatively lower surface energy surface may have an angle approaching 90 degrees and a corresponding Cahn value that is relatively low or approaching zero. Some relatively low Cahn values, such as may be measured on relatively low energy, hydrophobic surfaces may even demonstrate a reported Cahn value that is less than zero.

Over time, the surface energy of some film embodiments may dissipate or lose some of the energy that was present immediately after treatment. A film surface may exhibit a particular surface energy shortly after treatment and a reduced level of energy a few weeks later. For purposes herein, the Cahn values provided refer to surface energies or Cahn values of films that are aged at least two weeks after either surface treatment or after production if not treated.

The product side exterior surface of films according the present invention may either inherently possess a surface energy level or may be treated to possess a surface energy level demonstrating a receding DCA Cahn value of at least about 0.48. Though the exact amount of surface energy required for suitable performance of a film in any particular packaging operation may vary according to humidity, product composition, temperature and shape, packaging line speed and numerous other variables, it has been determined that for packaging of products that are water-based or possess a substantial moisture content, for many preferred film embodiments and applications, the multilayer film should inherently possesses or be treated to possess a receding Cahn value of at least 0.48.

As for a desired or target upper Cahn value limit, if the receding DCA Cahn value of at least 0.48 represents surface energy that is inherently present in the film at the level desired without treating the surface, then no upper limit Cahn value may be relevant and the upper limit may effectively approach 1.00. However, from an operational standpoint, if the product side of the film must be treated to obtain the desired or target Cahn value, then it is preferred that the target Cahn value should not exceed about 0.89 to prevent over-treatment of the film. For many preferred embodiments, the product surface may possess or may be treated to possess a Cahn value of from at least about 0.60 to about 0.87. More preferably, the product surface may possess or may be treated to have a Cahn value of from at least about 0.64 to about 0.87. In still other preferred embodiments, the product surface may possess or may be treated to have a Cahn value of from at least about 0.65 to about 0.78. Thereby, the film according to this invention may possess sufficient surface energy on the product surface to facilitate improved reliability and line-speed during packaging operations of water-based products, over a wide variety of moisture-related environmental conditions and product moisture content, as compared to film having a non-treated or relatively lower exterior surface energy.

In heat-sealable film embodiments according to the present invention, the heat-sealable skin layer should comprise a polymer composition that provides a minimum seal temperature ("MST") within a range that permits the film to be commercially useful for its intended purpose. The acceptable MST range is from about 175° F. to about 220° F., with a jaw pressure of 20 psi for 0.75 seconds, on a WRAP-ADE™ model J or K crimp sealer, with vertically serrated crimp jaws, wherein the product side of the skin layer sealed to itself. Seal strength testing is performed on a SUTER™ tester that pulls the seal apart at 12 in/min. MST seal strength is 200 g/in, and is determined at 175° F. seal temperature.

For films requiring surface treatment to energize the product side exterior surface of the film, it is preferred that the amount of treatment is limited or controlled so that the treatment will not adversely affect other desirable film properties such as sealability, optical, and/or aesthetic properties. For example, many polymer based sealable skin layers, such as those comprising propylene and/or ethylene homo-, co-, and ter-polymers, may require surface treating to possess sufficient surface energy to perform acceptably at high packaging speed. It has been learned that by providing a controlled or limited treatment level on the film product surface when such treatment is required that the surface may retain acceptable sealing properties.

As for the exterior-most surface of the film on the machine side of the core layer, in many film embodiments according to this invention, such surface or layer is not surface treated. Thereby, the machine side exterior surface may be relatively hydrophobic as compared to the product side of the film. It is desirable for the machine side of the film to be relatively non-water-wet, such that water tends to "bead-up" and not wet-out on the exterior surface. There may be some applications where the desired functionality and/or polymer composition on the machine side surface of the film requires a limited amount of surface treatment to accommodate another need, such as when printing on such surface with an aqueous-based ink. Otherwise, it may be advantageous in most embodiments not to surface treat the machine side surface of the film substrate, thereby maintaining the surface energy in a relatively reduced state as compared to the product side of the film. The reduced surface energy may minimize the adverse impact on processability caused by an accumulation and wetting out of moisture, such as by condensation or water overspray, upon the metal parts of the processing equipment. A polymeric film surface that exhibits increase surface energy may also exhibit an increased molecular attraction between the film, water, and packaging machine components, creating a processing problem. When the moisture on the equipment or in a damp environment comes in contact with a treated machine side surface, the water tends to wet-out or spread across a greater areal extent of the film web than it would on an untreated, non-water-wet film, which may result in increased friction, reduced slip, and increase molecular attraction. Such occurrence can produce mild to severe processing problems, including plastically deforming or tearing the film during packaging operations. As such, to prevent such problems it is preferred that the machine side surface of the sealable film not be treated or should be designed to possess an inherently low surface energy. Not wishing to be bound by such theory, the inventor believes that the relatively low surface energy may demonstrate suppressed molecular attraction between the film surface, the moisture, and the machine components such that the friction between the film and the wet equipment surfaces is reduced as compared to the friction between a treated machine side film surface and wet machine surfaces. It is recognized, however, there may be applications where the machine side surface can be lightly treated with acceptable film processability and machinability.

In films according to the present invention, the receding DCA Cahn value of the exterior-most surface on the machine side of the film should not exceed a Cahn value of 0.20, preferably not greater than about 0.17, and more preferably not greater than about 0.15. For some embodiments, the Cahn value measurements may even be slightly negative values.

In some embodiments where some level of treatment of the machine side exterior surface is required, the most exterior machine side surface may be treated and then partially coated or printed, to attenuate or partially obscure any molecular attraction effect created by the surface treatment. For example, a machine side exterior surface of the film may be treated such as by plasma treatment and then printed with an ink, pattern-coated with a coating, or coated with a non-polar coating, whereby the ink or coating covers at least about ten (10) percent of the surface area of the machine side exterior surface of the film. The ink or coating may mitigate the effect of the surface treatment such that the receding DCA Cahn value of the surface after treating and coating or printing is not greater than about 0.20, preferably not greater than about 0.17, and more preferably not greater than about 0.15. Also, in some embodiments the machine side skin layer may comprise an antiblock agent or other additives therein to not only attenuate the effect of a surface treatment, but also to prevent blocking and further reduce machine side friction.

In a basic form, films according to the present invention may comprise only a polymeric core layer and a polymeric sealant skin layer. In such embodiments, the machine side of the core layer may provide the machine side exterior surface of the film. In many preferred embodiments, one or more polymeric layers may be provided on the machine side of the core layer. Thereby, such exterior surface of the one or more polymeric layers may provide the machine side, exterior surface of the film.

The machine side skin layer comprises a thermoplastic polymer resin or combination of resins as may be suitable for the intended processing conditions, printing, or use of the film, preferably an olefin polymer. For example, the machine side skin layer may comprise polypropylene, polyethylene, polybutylene, polyesters, and blends thereof. In one preferred embodiment, the machine side skin layer comprises primarily polyethylene, such as HDPE, MDPE, LLDPE, LDPE, VLDPE, copolymers of ethylene, such as ethylene-propylene copolymer, and blends thereof. Other embodiments may comprise a high crystallinity polypropylene.

Machine side tie layers may also be present between the machine side skin layer and the core layer. Such machine side tie layers may comprise a thermoplastic polymer, preferably a polyolefin or polyester polymer. The machine side tie layer may include opacifying or coloring agents or pigments, such as whitening agents, including titanium dioxide.

Though not critical, the overall thickness of a film according to this invention may typically range from about 5 microns to about 60 microns, and may preferably range from about 10 microns to about 50 microns, and even more preferably from about 30 microns to about 45 microns.

The invention further relates to a method of making a sealable film that is suitable for packaging operation use with moist or water-bearing products and for use in a humid or wet environment. The method preferably comprises steps for making a heat sealable film embodiment. However, other film embodiments may be prepared that are sealable other than by heat seal, such as by application of a cold glue adhesive to the exterior surface of the sealable skin layer. Suitable cold glue adhesives may include water or solvent based adhesives that require some drying to achieve a full strength bond, or an adhesive such as a rubber, latex, or other "tacky" type of adhesive or cement. In the broadest sense, films according to the present invention may be sealable on the inside surface or product side surface of the film. Preferred embodiments may be heat-sealable through incorporation of a coextruded heat-sealable skin layer, such as a terpolymer olefin sealable skin layer.

One preferred method for preparing a film comprises the steps of; (a) coextruding a sealable polymeric film structure including a product side and a machine side, the film structure comprising (i) a core layer including a thermoplastic polymer, the core layer having a machine side and a product side on an opposite side of the core layer from the machine side, and (ii) a sealable skin layer positioned on the product side of the core layer, the sealable skin layer comprising a thermoplastic polymer, wherein an exterior surface on the product side of the sealable polymeric film has a receding Cahn value of at least about 0.48; and (b) orienting the coextruded sealable film structure in at least one direction. Preferably, the film is biaxially oriented, though some embodiments may be uniaxially oriented. Also, the Cahn value is measured after orientation and treatment, and after the film has aged for at least two weeks after treatment.

The method may further comprise the step of surface treating the product side exterior surface of the skin layer with one of corona treatment, flame treatment, and plasma treatment. Surface treating may commonly be required to provide the outer surface of the sealable skin layer with the desired surface energy.

Though methods according to this invention may be useful to prepare films having a Cahn value of at least 0.48, wherein such films may be suitable for many applications and are within the scope of this invention, preferably the methods are used to prepare films wherein the exterior surface of the sealable skin layer has a Cahn value of from about 0.6 to about 0.87, or more preferably a Cahn value of from about 0.65 to about 0.78. Though some film embodiments may be prepared having Cahn values greater than the upper limits prescribed herein, the upper limits may be preferred as useful guidelines in that values in excess of those prescribed may possess more energy than is necessary to obtain suitable film packaging performance. However, as many film embodiments may be prepared with coextruded heat-sealable olefin or other polymer resins as the sealable skin layer, typically such sealable layer will require surface treatment to provide sufficient surface energy to render the surface suitable for use in the improved applications as described herein. As surface treating can destroy or reduce the heat-sealability characteristics of a heat-sealable skin layer if too much treatment energy is used, it is preferred that the application of surface energy be limited to only an amount of surface energy necessary to provide suitable packaging performance during a period of time after treatment date. Thereby, it is recommended that the film only be treated to possess a limited or target level of surface energy to avoid such over treating. Thus, the upper limits prescribed herein may serve as guidelines for selecting an appropriate treating level and method.

The methods of this invention may also be utilized to prepare a heat sealable film as may be used in many preferred embodiments and applications. The method may comprise the step of coextruding a heat-sealable, skin layer. Such heat-sealable skin layer may be sealed to itself, such as with a fin seal or end seal, or sealed to the opposing machine side of the film such as with a lap seal. When the product side is sealed to itself, such as a fin or end seal, the film preferably has a MST of from about 175° F. to about 220° F., with a jaw pressure of 20 psi for 0.75 seconds and a minimum acceptable seal strength of 200 g/in at 175° F., on a WRAP-ADE™ Crimp Sealer Model J or K. Alternatively, the seal may be effected by applying one of a cold glue adhesive and a pressure sensitive adhesive to the product side exterior surface of the sealable skin layer and/or to both the product side sealable skin layer and the machine side of the film. In such alternative embodiments, it may not be necessary that the sealable skin layer comprise a resin that would render the skin layer heat sealable. For example, the sealable skin layer may comprise an isotactic polypropylene or polyethylene having a relatively high crystallinity.

Preferred methods may also comprise coextruding a second skin layer on the machine side of the core layer. Thereby, the film has skin layers on each side of the core layer. The method may also comprise coextruding tie layers, such as a product side tie layer between the core layer and the sealable skin layer, and/or a machine side tie layer between the core layer and the second skin layer.

Though some methods of producing films according to this invention do not include surface treating the machine side exterior surface, some embodiments may benefit from surface treatment of that side to provide other film functionalities. For example, the machine side surface may require printing. The methods for preparing the film may include the step of applying a minimal amount of surface treatment to facilitate proper ink wetting and adhesion. However, if the aerial extent of ink coverage exceeds an application-determinative threshold, preferably at least about ten percent of the film surface area for some embodiments, such coverage may sufficiently dampen or attenuate the surface energy created by the surface treatment such that the net receding DSC Cahn value is not greater than 0.20, after coating or printing. A similar attenuation effect may be obtained by pattern coating the exterior surface with a coating formulation, such as an acrylic coating on at least about ten percent of the surface area.

The methods according to this invention may also comprise a method of packaging a product in a sealable polymeric film structure. Suitable methods for packaging a product may comprise the steps of; (a) drawing a sealable polymeric film structure through a packaging machine from an inlet side of the packaging machine to an outlet side of the packaging machine, the sealable polymeric film structure including a product side and a machine side, the multilayer film comprising (i) a core layer comprising a thermoplastic polymer, the core layer having a machine side and a product side, and (ii) a sealable skin layer comprising a thermoplastic polymer, wherein an exterior surface of the sealable skin layer has a receding Cahn value of at least about 0.48; (b) positioning a product on the product side exterior surface of the sealable skin layer; (c) contacting a first portion of the product surface of the film with another portion of the product surface of the film to form a package cavity and to bond the first portion with the second portion over the contacted area, wherein the product is positioned within at least a portion of the package cavity; and (d) applying at least one of heat and pressure to at least a portion of the seal area to bond the first portion of the sealable skin layer to the second portion of the sealable skin layer and encase at least a portion of the product within the product space. Contacting a first portion of the product surface with another portion of the product surface means that the product side sealable skin layer is sealed to itself, such as with a fin seal or with an end seal. Though fin seals may be preferred, it is also within the scope of this invention that the product side of the film may be sealed to the machine side of the multilayer film, such that the sealable skin is sealed to either the second skin layer or the core layer on the machine side of the core layer. The step of applying either or both of heat and pressure to at least a portion of the seal area means that the film may be either heat sealable and/or it may be sealable by means other than heat, such as with a cold glue adhesive or cement. The term product may be defined broadly to include substantially any item, good, or article that may be packaged at least partially, within a film package created with films according to this invention.

A product to be packaged by the film may be placed or positioned on the product side of the film, such as by feeding from a conveyor or other product transport mechanism. In some preferred applications this operation may be performed on a horizontal FFS machine. The product may be substantially any article or item for packaging, wherein the product is fed onto the film, however, aqueous-based products may realize the highest benefit from packaging in film according to this invention, particularly an edible product such as a frozen ice-pop treat, ice cream bar, yoghurt-based product, or substantially any other sugar-based or sugar-free treat or novelty bar.

The step of contacting a first portion of the product side surface of the film with another portion of the product side surface of the film to form a package cavity may typically involve folding opposing edge margins of the film to engage each other, forming a pocket or spatial region that may confine or envelope at least a portion of the product. The opposing edge margins may be engaged with each other to facilitate fin sealing, lap sealing, or end sealing, preferably fin sealing. Preferably heat, but alternatively a contact adhesive or cold-glue adhesive may be applied to the engaged portions of the product side margin(s) to cause the first edge margin to seal to the second edge margin. When heat is used to create the seal, the sealable skin layer resin type and thickness will determine the appropriate amount of heat, pressure, and duration of time to the contacted area to form a substantially hermetic seal over the contacted area. The package may also be sealed in like fashion on each end, transversely from the first seal, to create the end seals and confine the product within the product cavity.

TABLE I

| Optical Gauge, mil = | 1.4 | Film I: | Film II: |
|---|---|---|---|
| Poly Gauge, mil = | 1.2 | Receding | Receding |
| Yield, in²/lb = | 24,500 | Cahn | Cahn |

TABLE I-continued

| | | | Value Before Sealant Layer Treatment | Value After Sealant Layer Treatment |
|---|---|---|---|---|
| | Density = | 0.81 | | |
| Outside | (Machine Side) | | 0.9465 | 0.1503 |
| HDPE + antiblock | Spartech A27527 (PE) (commercially available from Spartech Corporation of Clayton, Missouri) | TOTAL = 4.8 ga. 4.0% | Corona Treated Print Layer | Untreated Print Layer |
| PP Homo + TiO$_2$ | Exxon 4612 (commercially available from ExxonMobil Chemical Company of Baytown, Texas) | TOTAL = 18.0 ga. 15.0% | | |
| PP Homo + PBT | Exxon 4612 (commercially available from ExxonMobil Chemical Company of Baytown, Texas) | TOTAL = 73.8 ga. 61.5% | | |
| PP Homo | Exxon 4612 (commercially available from ExxonMobil Chemical Company of Baytown, Texas) | TOTAL = 18.0 ga. 15.0% | | |
| Terpolymer w/ Tospearl | Chisso 7791 (commercially available from Chisso Corporation of Japan) | TOTAL = 5.4 ga. 4.5% | Untreated Sealant Layer | Corona Treated Sealant Layer |
| Inside | (Product Side) | | −0.0493 | 0.6916 |

Table I demonstrates two similar film compositions, Film I and Film II, with the fourth column from the left displaying the receding DCA Cahn Value (cosine of the contact angle) of the comparative, prior art Film I that was treated on the outside for printability, and the fifth column demonstrating the Cahn value of Film II prepared according to the present invention. The film embodiments are identical except that the prior art Film I is treated on the machine side outer surface and is not treated on the product side or sealable skin layer. The illustrative Film II embodiment is treated on the product side and reflects a substantially energized product side surface as compared to the untreated surface. The outside or machine side of Film II, however, is untreated and reflects a substantially reduced surface energy as compared to the prior art film.

Film I was used in packaging sugar-free novelty ice-pop treats at a packaging machine rate of 20.5 lifts per minute, resulting in an average waste of over 3300 lbs of product over a 20 hour production run. However, the inventive Film II and methods discussed herein demonstrated improved 20 hour production runs with product wastes of less than 1300 lbs per run, with a packaging machine operating speed of 21.6 lifts per minute. Film II represents a product waste reduction of 61% with a corresponding 5.4 percent increase in packaging line operation rate, translating into substantial savings and line operating efficiency. Additionally, due to the untreated machine side exterior surface, Film II also demonstrated a reduction in splits, tears, and down time due to film transport problems in the packaging machinery.

What is claimed is:

1. A method of packaging a product within a heat-sealable polymeric film on a packaging machine, the method comprising the steps of:
   (a) drawing the heat-sealable polymeric film structure through the packaging machine from an inlet side of the packaging machine to an outlet side of the packaging machine, the heat-sealable polymeric film structure having a product side and a machine side, the heat-sealable polymeric film structure comprising:
   (i) a core layer having a machine side and a product side opposite from the machine side, wherein the core layer comprises a polymer matrix and optionally a cavitating agent;
   (ii) a heat-sealable skin layer on the product side of the core layer, the heat-sealable skin layer having a product side exterior surface with a product side surface energy having a receding DCA Cahn value of at least about 0.48;
      wherein the heat-sealable skin layer comprises a polymer material selected from the group consisting of polyethylene, polybutene, polylactic acid, propylene-ethylene copolymers, propylene-butylene copolymers, propylene-ethylene-butylene terpolymers and ethylene-propylene-butylene terpolymers;
   (b) positioning a product on the product side exterior surface of the heat-sealable skin layer;
   (c) engaging a first portion of the product side exterior surface of the heat-sealable skin layer with a second portion of the product side exterior surface of the heat-sealable skin layer, whereby a seal area is formed over the engaged portions of the product side exterior surfaces of the heat-sealable skin layers, or
   optionally engaging a first portion of the product side exterior surface of the heat-sealable skin layer with a portion of the machine side of the heat-sealable polymeric film structure, whereby a seal area is formed over the engaged portions of the product side exterior surface of the heat-sealable skin layer and the machine side of the heat-sealable polymeric film, whereby a product space is created within the product side of the heat-sealable polymeric film structure; and
   (d) applying heat to at least a portion of the seal area to form a seal and encase at least a portion of the product within the product space,
   wherein the seal formed has the following sealing properties: (A) a minimum sealing temperature (MST) of from about 175° F. to about 220° F. with a jaw pressure of 20 psi for 0.75 seconds, and (B) a minimum acceptable seal strength of 200 g/in at 175° F., wherein the product is substantially frozen and comprises at least one of water, an aqueous-based product, or dairy-based product.

2. The method of packaging a product of claim 1, wherein the aqueous-based or dairy-based product comprises at least one of an ice cream treat, a sugar-based treat, a sugar-free treat, and a yogurt treat.

3. The method of packaging a product of claim 1, wherein at least a portion of the product is adhered on the product side exterior surface of the heat-sealable skin layer when the packaging machine is damp or in a humid environment.

4. The method of packaging a product of claim 3, wherein the product side exterior surface of the heat-sealable skin layer is surface-treated by one of corona treatment, flame treatment, and plasma treatment.

5. The method of packaging a product of claim 1, wherein the product side exterior surface of the heat-sealable skin layer is surface-treated by one of corona treatment, flame treatment, and plasma treatment.

6. The method of packaging a product of claim 5, wherein at least a portion of the product is adhered to the surface-treated product side exterior surface.

7. The method of packaging a product of claim 6, wherein the sealing properties of the heat-sealable skin layer are maintained following surface treatment.

8. The method of packaging a product of claim 1, wherein the heat-sealable polymeric film structure of step (a) further comprises (iii) a second skin layer on the machine side of the core layer, the second skin layer having a machine side exterior surface with a machine side surface energy having a receding Cahn value not to exceed 0.20, wherein the second skin layer is a thermoplastic polymer selected from the group consisting of polypropylene polyethylene polybutylene, polyesters and blends thereof.

9. The method of packaging a product of claim 8, wherein the machine side surface energy has a receding Cahn value that is negative.

10. The method of packaging a product of claim 8, wherein at least a portion of the machine side exterior surface is non-water-wet when the packaging machine is damp or in a humid environment.

11. The method of packaging a product of claim 10, wherein the machine side exterior surface of the second skin layer is surface-treated by one of corona treatment, flame treatment, and plasma treatment.

12. The method of packaging a product of claim 11, further comprising the step of applying one of a printing ink and a coating composition on at least about 10% of the area of the machine side exterior surface.

* * * * *